N. F. Burnham,

Water Wheel,

No. 1,530. Reissued Sep. 1, 1863.

Witnesses:

James H. Gridley

J. Sherrill

Inventor:

N. F. Burnham

By Munn & Co

Attorneys

N. PETERS, PHOTO-LITHOGRAPHER, WASHINGTON, D. C.

UNITED STATES PATENT OFFICE.

NATHAN F. BURNHAM, OF YORK, PENNSYLVANIA.

IMPROVEMENT IN WATER-WHEELS.

Specification forming part of Letters Patent No. 23,011, dated February 22, 1859; Reissue No. 1,530, dated September 1, 1863.

*To all whom it may concern:*

Be it known that I, NATHAN F. BURNHAM, formerly of Laurel Factory, Maryland, now of the borough and county of York, in the State of Pennsylvania, have invented certain new and useful Improvements in Turbine Water-Wheels; and I do hereby declare that the following is a full and exact description of the same, reference being had to the accompanying drawings, making part of this specification, in which—

Figure 1:
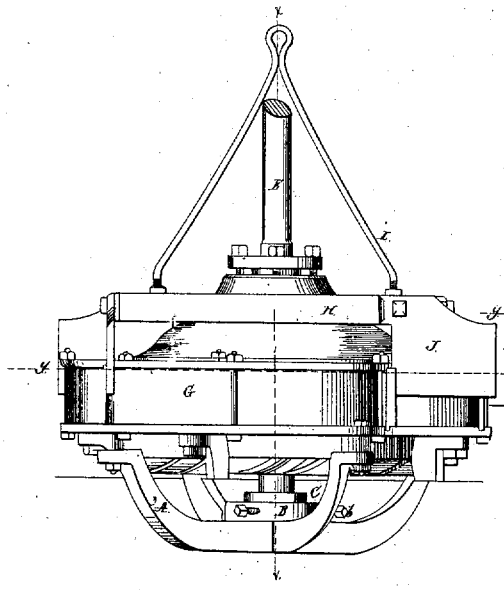
Figure 3:
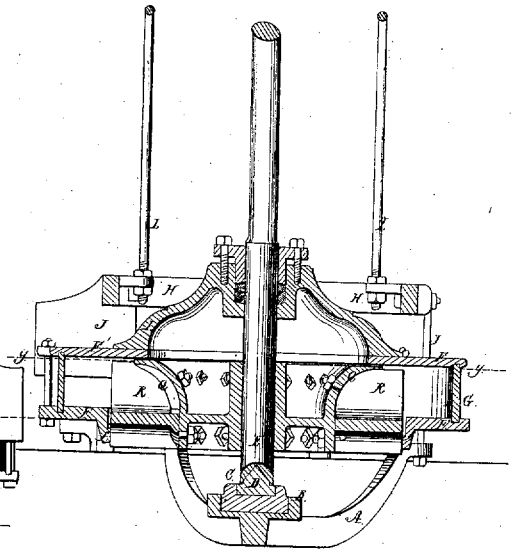
Figure 2:
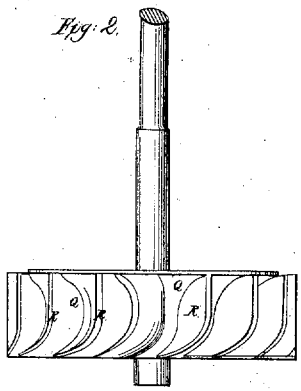
Figure 4:
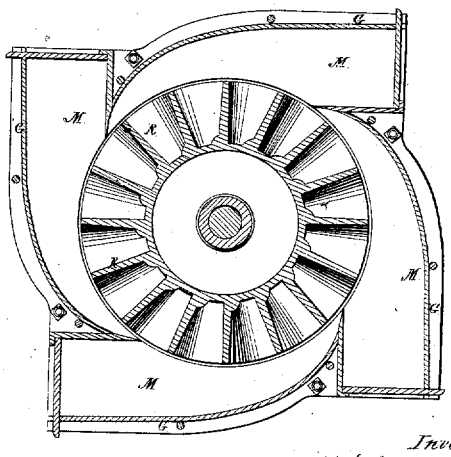

Figure 1 is an elevation of the wheel and casing in position for use. Fig. 2 is an elevation of the wheel alone. Fig. 3 is a vertical section at *x x*, Figs. 1 and 4. Fig. 4 is a horizontal section at *y y*, Figs. 1 and 3.

Similar letters of reference indicate corresponding parts in the several views.

This invention relates to certain improvements in what is known as the "Jonval Turbine Wheel;" and the said improvements consist, first, in a construction of hub adapted by its peculiar form to be acted on with a lifting tendency by the entrance of the water, and employed in combination with a peculiar form of bucket adapted to receive successively the percussive and the gravitating force of the water; second, in a peculiar construction and arrangement of parts, by which the wheel is made to operate to the best possible advantage with either a large or small quantity of water, or with any proportionate quantity of the whole body of water.

In order that others skilled in the art to which my invention appertains may be enabled to fully understand and use the same, I will proceed to describe its construction and operation.

A is a cross of cast-iron, secured to the chutes by four large screw-bolts, so that it may be raised or lowered as needful.

B is a circle cast upon the cross, and provided with four set-screws, *b b b b*, by means of which the step may be accurately centered.

C is a cast step-box, by which the step D is supported and held. The said step is made of hard wood, boiled in tallow.

E is the wheel-shaft, the lower end of which is turned out to fit upon and over the step D.

The bottom chute-plate, F, may be cast in one piece, with a curb, *f*, turned out at bottom, so that the wheel may fit closely to it, as shown in Fig. 3.

The sides G G of the chutes are curved so as to form converging scrolls M M, Fig. 4, by which the water is forced in toward the center of the wheel under the concavity Q of the hub.

The peculiar form of the periphery of the hub is clearly represented in Figs. 2 and 3.

R R are cast buckets fitted to the periphery of the hub. The faces of the said buckets are vertical from the top down so far as the concavity of the hub extends, and for the rest of their length are curved in spiral form proportioned to the velocity of water under which the wheel is to run.

The distance of the inner ends of the chutes G from the wheel is so proportioned to the width of the discharge-spaces between the lower ends of the buckets as to permit the water to leave freely without choking.

H is a square iron frame, to which the gates J J are bolted.

L L are wrought-iron rods, which connect the gate-frame to wooden levers in the forebay, having a wooden stem reaching up into the mill, and provided with a rack and pinion to raise and lower the gates.

I is a cap covering the top of the wheel, and turned out to fit the wheel-shaft E, which passes up through it. The said cap is bolted fast to the upper plate, F′, of the chutes.

The action of water, when admitted to this wheel, is as follows: As the water leaves the forebay, it follows the curvature of the chutes until it reaches the periphery of the wheel, where it is deflected inward and downward by the combined forms of the chutes and of the hub. The effect of this is to exert a lifting tendency on the wheel, and to cause the water to act with its percussive force directly upon the upper parts of the buckets, and being deflected easily downward to act by gravitation upon the lower curved or spiral parts of the buckets.

The inclination of the lower parts of the buckets being adapted to correspond with the velocity of the water, the latter will act thereon to the best possible advantage and leave with the greatest freedom. It will thus be seen that the water has two actions—first, direct at the extreme periphery of the wheel, and, second, by weight on the incline of the buckets.

Having thus described my invention, what I claim as new therein, and desire to secure by Letters Patent, is—

1. A hub formed with a concave exterior in any manner, substantially as described, so as to derive a lifting tendency from the entrance of the water and deflect it downward, in the described combination with a bucket formed with a face vertical, or nearly so, at top, to receive the direct force of the water, and inclined at bottom to receive its gravitating force.

2. The combination of the chutes or scrolls M M and wheel Q R, constructed as herein described, to adapt the wheel to operate with good effect with any proportionate quantity of water.

NATHAN F. BURNHAM.

Witnesses:

JOSIAH E. MEYERS,

GEORGE M. SHELTER.